(12) United States Patent
Unger

(10) Patent No.: US 7,917,442 B2
(45) Date of Patent: Mar. 29, 2011

(54) SYSTEM AND METHOD FOR RELAXING MEDIA ACCESS RESTRICTIONS OVER TIME

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 488 days.

(21) Appl. No.: 11/525,287

(22) Filed: Sep. 21, 2006

(65) Prior Publication Data

US 2008/0126256 A1 May 29, 2008

(51) Int. Cl.
*G06Q 99/00* (2006.01)
(52) U.S. Cl. .......................... 705/55; 725/37
(58) Field of Classification Search .................. None
See application file for complete search history.

(56) References Cited

U.S. PATENT DOCUMENTS

| | | | | |
|---|---|---|---|---|
| 5,351,298 | A * | 9/1994 | Smith | 380/30 |
| 5,629,868 | A * | 5/1997 | Tessier et al. | 348/164 |
| 5,636,277 | A * | 6/1997 | Nagahama | 705/59 |
| 5,963,193 | A * | 10/1999 | Knox et al. | 345/601 |
| 6,314,521 | B1 * | 11/2001 | Debry | 726/10 |
| 6,389,538 | B1 * | 5/2002 | Gruse et al. | 713/194 |
| 6,393,566 | B1 * | 5/2002 | Levine | 713/178 |
| 6,611,812 | B2 | 8/2003 | Hurtado et al. | 705/26 |
| 6,738,905 | B1 * | 5/2004 | Kravitz et al. | 713/194 |
| 7,242,766 | B1 * | 7/2007 | Lyle | 380/2 |
| 7,321,660 | B2 * | 1/2008 | Mont et al. | 380/277 |
| 7,398,547 | B2 * | 7/2008 | deCarmo | 726/3 |
| 7,407,092 | B2 * | 8/2008 | Silverbrook et al. | 235/380 |
| 2002/0049679 | A1 * | 4/2002 | Russell et al. | 705/52 |
| 2002/0080969 | A1 * | 6/2002 | Giobbi | 380/277 |
| 2002/0199195 | A1 * | 12/2002 | Townsend et al. | 725/60 |
| 2003/0097655 | A1 * | 5/2003 | Novak | 725/31 |
| 2003/0198348 | A1 * | 10/2003 | Mont et al. | 380/277 |
| 2003/0204736 | A1 * | 10/2003 | Garrison et al. | 713/193 |
| 2004/0001087 | A1 * | 1/2004 | Warmus et al. | 345/745 |
| 2004/0003248 | A1 * | 1/2004 | Arkhipov | 713/170 |
| 2004/0039923 | A1 * | 2/2004 | Koskins | 713/189 |
| 2004/0068470 | A1 * | 4/2004 | Klyne | 705/50 |
| 2004/0133794 | A1 * | 7/2004 | Kocher et al. | 713/193 |
| 2004/0190750 | A1 * | 9/2004 | Rodriguez et al. | 382/100 |
| 2004/0205345 | A1 * | 10/2004 | Ripley et al. | 713/176 |
| 2004/0264931 | A1 * | 12/2004 | Nakashika et al. | 386/95 |
| 2005/0038872 | A1 * | 2/2005 | Ono et al. | 709/218 |
| 2005/0058434 | A1 * | 3/2005 | Nakashika et al. | 386/95 |
| 2005/0091498 | A1 * | 4/2005 | Williams et al. | 713/176 |
| 2005/0177461 | A1 * | 8/2005 | Rosefelt et al. | 705/27 |

(Continued)

OTHER PUBLICATIONS

Silicon Image, High-bandwidth Digital Content Protection White Paper, Feb. 2000.*

(Continued)

*Primary Examiner* — Andrew J. Fischer
*Assistant Examiner* — Jacob C. Coppola
(74) *Attorney, Agent, or Firm* — John L. Rogitz

(57) ABSTRACT

A disk bears a multimedia program and a player plays the program. The player is responsive to an image restraint token (IRT) to play the multimedia program only in a low resolution format and not in a high resolution format prior to an IRT expiration date. The player is then responsive to a key that is publicly available only on or after the expiration date and entered into the player to play the multimedia program in the high resolution format.

5 Claims, 1 Drawing Sheet

U.S. PATENT DOCUMENTS

| | | | |
|---|---|---|---|
| 2006/0095792 A1 | 5/2006 | Hurtado et al. | 715/189 |
| 2006/0225138 A1* | 10/2006 | Toyohara et al. | 726/27 |
| 2006/0262710 A1* | 11/2006 | Shim et al. | 369/275.1 |
| 2007/0050643 A1* | 3/2007 | Negishi | 705/59 |
| 2007/0078777 A1* | 4/2007 | Demartini et al. | 705/59 |
| 2007/0097020 A1* | 5/2007 | Sato | 345/3.1 |
| 2007/0262135 A1* | 11/2007 | Hammell et al. | 705/44 |

OTHER PUBLICATIONS

Digital Home, What is an Image Constraint Token?, Sep. 9, 2006.*

High-bandwidth Digital Content Protection System Revision 1.0, Feb. 17, 2000.*

Digital Transmission Content Protection Specification vol. 1 (Informational Version) Revision 1.29 Draft, Sep. 12, 2003.*

Digital Connection, What is HDCP?, Jul. 10, 2004.*

AACS HD DVD and DVD Pre-recorded Book, Intel et al, Aug. 15, 2006, all pages.*

AACS Introduction and Common Crypto Elements, Intel et al, Feb. 17, 2006, all pages.*

* cited by examiner

SYSTEM AND METHOD FOR RELAXING MEDIA ACCESS RESTRICTIONS OVER TIME

FIELD OF THE INVENTION

The present invention relates generally to systems and methods for relaxing media access restrictions over time.

BACKGROUND OF THE INVENTION

In the television field, High Definition Multimedia Interface (HDMI), which is the successor to Digital Visual Interface (DVI) for video presentation, allows full uncompressed audio and video to be transmitted from a multimedia source, such as a disk player, to a TV over a single line. HDMI supports HD video formats (1080 p, etc.), and up to eight channels of audio at 192 KHz.

HDMI may be used in conjunction with High Definition Content Protection (HDCP), which is a security feature for preventing unauthorized hardware from connecting to authorized hardware and for transferring protected and encrypted data over a non-secure medium. In essence, HDCP uses a key exchange, and if a satisfactory key exchange is not effected, in some implementations including some DVD and Blu-Ray disk implementations, an "image restraint token" (IRT) on the disk can be set to prevent viewing the multimedia in full HD and to permit viewing the multimedia only in a lower resolution format, e.g., to a 960×540 pixel format or lower (720× 480). Thus, when a player is connected to a display using HDMI with HDCP, indicating an authorized connection and resulting in a successful key exchange, the IRT flag on the disk will not result in a lower resolution display, and the high resolution format will be presented. It is only when a non-HDCP situation arises that the IRT flag causes a low resolution format to be displayed.

As recognized herein, an IRT can be used to permit selling a movie on a disk before an expiration date, with viewing of the movie being permitted only in lower resolution formats (in non-HDMI/HDCP systems) until the expiration date, at which time the IRT is reset to permit viewing the movie in full resolution. In this way, revenue can be realized prior to an intended expiration date, while preserving the value of the expiration date in terms of prohibiting hi-resolution viewing until then. However, the present invention also recognizes that a pirate might try to advance the date on the player to be the expiration date and to thereby prematurely play the high resolution version. With this in mind, the invention herein is provided.

SUMMARY OF THE INVENTION

A method includes establishing an expiration date for a multimedia program restriction, and prior to the expiration date, providing the program on a storage medium to a user. Prior to the expiration date, the storage medium can be engaged with a player to play the multimedia program only in a low resolution format, with playing of the program in a high resolution format not being permitted unless HDCP authentication is successful. On or after the expiration date, however, a key is made publicly available, and users can be instructed to enter the key into their players, or the key can be automatically transferred into the players from a new disk obtained after the expiration date of the first disk. The key is useful to permit playing of the program in the high resolution format.

In non-limiting implementations the storage medium may be an optical disk, the high resolution format may be 1080p, and the low resolution format may 960×540 or lower.

In some embodiments an image restraint token (IRT) is used to permit the player to play the multimedia program only in the low resolution format and not in the high resolution format prior to the expiration date. The player can play the program in the high resolution format only if the key is entered into the player.

In another aspect, a system includes a disk bearing at least one multimedia program and a player engageable with the disk for playing the program. The player is responsive to an image restraint token (IRT) to play the multimedia program only in a low resolution format and not in a high resolution format prior to an expiration date. The player is responsive to a key that is publicly available only on or after the expiration date and entered into the player to play the multimedia program in the high resolution format.

In yet another aspect, a method includes vending a disk containing at least one multimedia program to a user prior to expiration date of the program, and permitting the program to be played only in a low resolution format prior to the expiration date. The method also includes, on or after the expiration date, publicizing a key that can be entered into a player to permit playing the program in a high resolution format.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
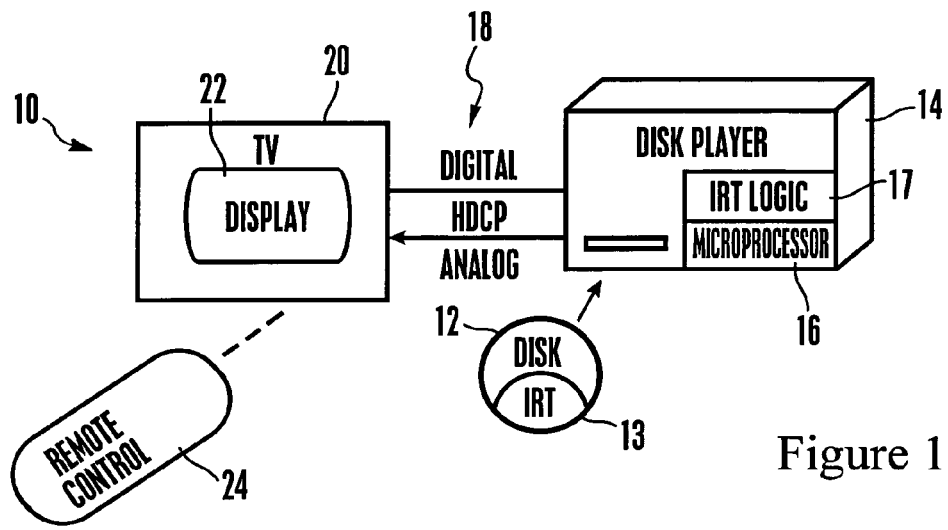
FIG. 1 is a block diagram of a non-limiting system of the present invention.

Referring initially to FIG. 1, a system is shown, generally designated 10, which includes a storage medium such as but not limited to a disk 12 such as but not limited to a DVD or Blu-Ray disk. The disk 12 can bear an image restraint token (IRT) 13, and can be engaged with a suitable disk player 14 with processor 16 to play multimedia streams such as movies on the disk 12 in accordance with logic below and embodied on computer readable medium 17 such as but not limited to random access memory or read-only memory that is accessible to the processor 16.

To display the streams, the player 14 may communicate over one or more wired or wireless links 18 with a display device such as but not limited to a TV 20 with TV display 22. A user may manipulate keys on a remote control 24 to input information into the TV and thence to the player 14 or to the player 14 directly for purposes to be shortly disclosed. The link(s) 18 may be any suitable link, e.g., a HDMI link, 802.11 link, or other link, and as indicated in FIG. 1, the streams may be output from the player 14 in analog format or in digital format with or without HDCP.

As discussed above, for a HDMI/HDCP system, an authorized connection is assumed, and the IRT flag will not prevent playing a movie in a high resolution format regardless of expiration date. The present invention is directed to other situations wherein the IRT is effective in preventing playing a particular movie or other stream high resolution format, permitting play of the movie only in a lower resolution format.

Figure 2:
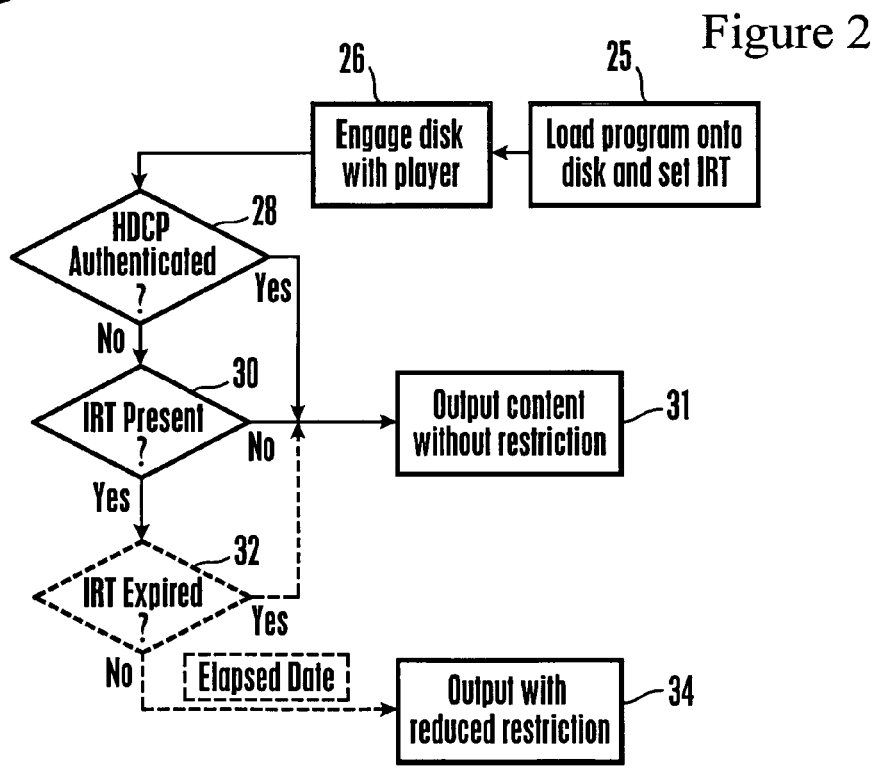
FIG. 2 is a flow chart of non-limiting logic in accordance with present principles.

To illustrate, FIG. 2 shows, starting at block 25, that one or more multimedia programs are loaded onto the disk 12. An image restraint token (IRT), which may be implemented as a flag and which can be accompanied by a disk expiration date, is set typically on the disk 12 itself to indicate to the processor 16 that one or more multimedia streams may be played only in a lower resolution format, e.g., 960×540 or lower, and not in a higher resolution format, e.g., 1080 p, assuming the system is not a HDMI/HDCP system as discussed above. The IRT value is established to this end in accordance with principles known in the art.

At block 26, after the disk is vended to a user, the user can engage the disk with the player 14 to play the multimedia stream. At this point, the logic below, as embodied in the computer medium 17 of the player 14 may be implemented by the processor 16 in the player 14.

If it is determined at decision diamond 28 that the display is HDCP authenticated or, if not, that no IRT is present on the disk at decision diamond 30, then the content is output by the player 14 to the TV 20 at block 31 for unrestricted play, including play at the highest resolution implemented on the disk. Thus, the IRT is not examined for pre-release low resolution play as discussed below in cases wherein there is no IRT on the disk or where successful HDCP authentication of the display device occurs.

However, in non-HDCP cases when an IRT is present on the disk, the logic proceeds to decision diamond 32 to determine whether the IRT is expired (by examining the elapsed date associated with the IRT). If the IRT is expired the content is output at block 31 for unrestricted play as before, but if the IRT is not expired the multimedia stream is played in the lower resolution format at block 34. It cannot be played in the higher resolution format at this time because the below-described key has not yet been input to the player 14. The expiration date itself may be publicized at the time of vending the disk 12 and/or displayed when the disk 12 is played, so that the user knows the expiration date. Also, the locations at which the user may learn the below-described key on or after the expiration date may be similarly publicized.

On or after the expiration date, an encryption key is made publicly available. The key may be made publicly available in the clear in any number of non-limiting ways, e.g., publishing the value of the key in a broadcast or in print media such as newspapers and magazines, public announcements both written and oral, on a web site, etc. Alternatively, after the expiration date a user might obtain another "new" disk (not shown), and the new disk can contain keys for all disks having prior expiration dates. In this form of publication, the keys can be transferred automatically to the player when the new disk is engaged therewith, and the player can use the appropriate key from the "new" disk to "unlock" the old disk 12 and permit playing its streams in the high resolution format.

Figure 3:
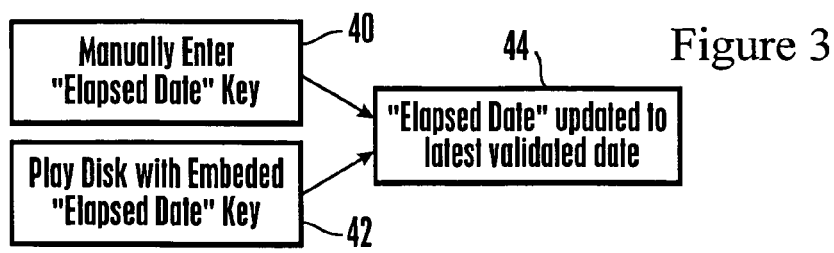
FIG. 3 is a state diagram showing how a high resolution version on a non-HDCP display can be attained.

Thus, now referring to FIG. 3, at block 40 the user may obtain the now-public key and input it to the player 14 by means of, e.g., the remote control 24 or other means (e.g., linking the player 14 to another component in a home entertainment network and downloading the key to player from the other component, etc.). Or, at block 42 a disk may be engaged with the player 14 that has the key on it, with the key being automatically transferred into the player 14. In either case, the effect is that the logic flows to block 44 wherein the otherwise secure elapsed date register in the player 14 that is associated with the relevant disk is advanced so that the player 14 effectively considers that the expiration date has passed at decision diamond 32 in FIG. 2, thus permitting play of the stream in the higher resolution format.

The way by which the key releases the higher resolution format is not limiting. In one embodiment the disk 12 bears the key and a user cannot access the key on the disk. When the user inputs the key to the player, the player can compare the user-input key with the key on the disk and if there is a match, play the higher resolution version. Or, the key may be input as one of many keys to the player 14 at manufacturing time or downloaded to the player 14 sometime thereafter for comparison with a user-input key value. Still again, the IRT may be encrypted by the key in a way that makes altering or otherwise operating on the IRT impossible unless and until the key is input to the player. Additionally, an IRT per se need not be used in some embodiments, with the player 14 programmatically denying play of the higher resolution format until such time as a proper key is input.

It may now be appreciated that the disclosure above adds an expiration date to the concept of an IRT, provides for an elapsed date register in playback devices, and provides a secure means to update the elapsed date register.

While the particular SYSTEM AND METHOD FOR RELAXING MEDIA ACCESS RESTRICTIONS OVER TIME is herein shown and described in detail, it is to be understood that the subject matter which is encompassed by the present invention is limited only by the claims.

What is claimed is:

1. A method comprising:
vending a first disk containing at least one multimedia program to a user prior to expiration date of the program;
permitting the program to be played by a player apparatus only in a low resolution format prior to the expiration date by placing on the first disk data indicating to the player apparatus that low resolution only may be played prior to the expiration date unless successful content protection authentication of the program on the disk is executed by the player apparatus before the expiration date, wherein if said content protection authentication is successful before the expiration date the player apparatus is permitted to play the program in a high resolution format before the expiration date; and
on or after the expiration date, publicizing a key that can be entered by a user into the player apparatus to permit playing the program in a high resolution format without requiring further authentication therefor, the key being publicized by making available to the user after the expiration date a second disk containing the key, the key being transferred automatically to the player responsive to the second disk is engaged with the player, the player using the key from the second disk to unlock the first disk to thereby permit the player to play content on the first disk in the high resolution format.

2. The method of claim 1, wherein the high resolution format is 1080p.

3. The method of claim 1, wherein the low resolution format is 960×540 or less.

4. The method of claim 1, wherein an image restraint token (IRT) is used to permit playing the multimedia program only in the low resolution format and not in the high resolution format prior to the expiration date.

5. The method of claim 4, wherein the IRT is operated on to permit playing the program in the high resolution format only if the key is entered by the user.

\* \* \* \* \*